United States Patent [19]

Yerbury et al.

[11] Patent Number: 5,134,277
[45] Date of Patent: Jul. 28, 1992

[54] REMOTE DATA TRANSFER SYSTEM WITH AMBIENT LIGHT INSENSITIVE CIRCUITRY

[75] Inventors: Michael J. Yerbury, New South Wales; Christopher J. Gamgee, Victoria; Graeme J. Bullock, Victoria; Peter L. Jones, Victoria, all of Australia

[73] Assignee: Australian Meat and Live-Stock Corporation, New South Wales, Australia

[21] Appl. No.: 577,796

[22] Filed: Sep. 5, 1990

Related U.S. Application Data

[63] Continuation of Ser. No. 431,674, Nov. 2, 1989, abandoned, which is a continuation of Ser. No. 205,538, Jun. 10, 1988, abandoned, which is a continuation of Ser. No. 4,349, Jan. 16, 1987, abandoned, which is a continuation-in-part of Ser. No. 802,063, Nov. 22, 1985, abandoned, which is a continuation of Ser. No. 549,626, Nov. 7, 1983, abandoned.

[51] Int. Cl.⁵ ............................................. H01J 40/14
[52] U.S. Cl. ............................ 250/214 RC; 250/214 B
[58] Field of Search ................... 250/341, 338.1, 221, 250/216, 239, 214 B, 214 RC; 342/44, 53; 340/825.54; 455/603, 604, 617

[56] References Cited

U.S. PATENT DOCUMENTS

| 3,377,616 | 4/1968 | Auer, Jr. ......................... 340/825.54 |
| 3,815,093 | 6/1974 | Caretto et al. ................. 340/825.54 |
| 3,880,528 | 4/1975 | Petersen et al. ...................... 250/239 |
| 3,897,753 | 8/1975 | Lee et al. . |
| 3,937,880 | 2/1976 | Schlenker . |
| 4,036,178 | 7/1977 | Lee et al. . |
| 4,262,632 | 4/1981 | Hanton et al. . |
| 4,314,283 | 2/1982 | Kramer .................................. 250/228 |
| 4,325,146 | 4/1982 | Lennington ......................... 455/604 |
| 4,376,576 | 3/1983 | Snelling ................................ 250/227 |
| 4,420,684 | 12/1983 | Gauthier ................................ 350/1.1 |
| 4,510,495 | 4/1985 | Sigrimis et al. ................. 340/825.54 |
| 4,532,537 | 7/1985 | Kane .................................. 250/211 J |
| 4,583,860 | 4/1986 | Butner ................................... 250/228 |
| 4,641,374 | 2/1987 | Oyama ................................. 455/603 |
| 4,724,312 | 2/1988 | Snaper ............................. 250/214 B |

FOREIGN PATENT DOCUMENTS 0061373 9/1982 European Pat. Off. .

Primary Examiner—David C. Nelms
Attorney, Agent, or Firm—Blakely, Sokoloff, Taylor & Zafman

[57] ABSTRACT

A remote data transfer system, particularly an identification system for identifying objects such as livestock, pets and containers. An interrogator generates a directional light beam which the operator can direct at a selected animal or package up to 30-14 200 meters away; and a tag transponder carried by the object is activated only on receipt of the light beam, and transmits a coded RF signal. The signal is received by the interrogator which displays the identity of the animal derived from the coded RF signal. In its "receive" mode, the tag transponder requires minimal power, thereby prolonging battery life. A short rise time light pulse (or a pulse sequence) is identified and used to switch power to the transponder. After transmission of the coded RF signal, the transponder returns to a low power draw stand-by state. The tag is also able to transmit real time information, with or without the tag identity data. Furthermore, the tag is able to accept data from a remote source and substantially simultaneously transmit data.

47 Claims, 6 Drawing Sheets

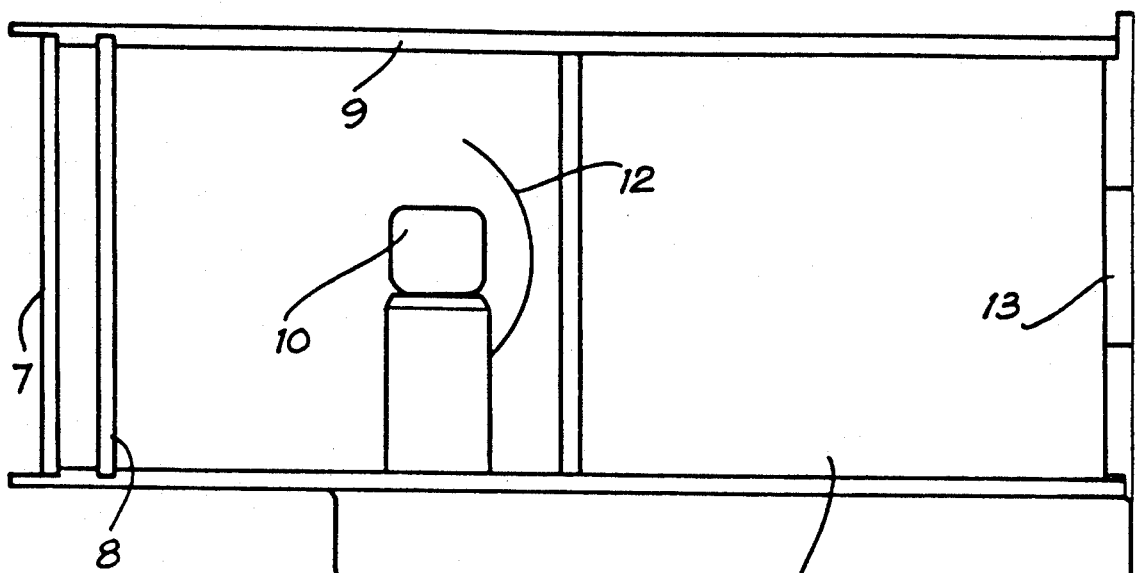
FIG. 2
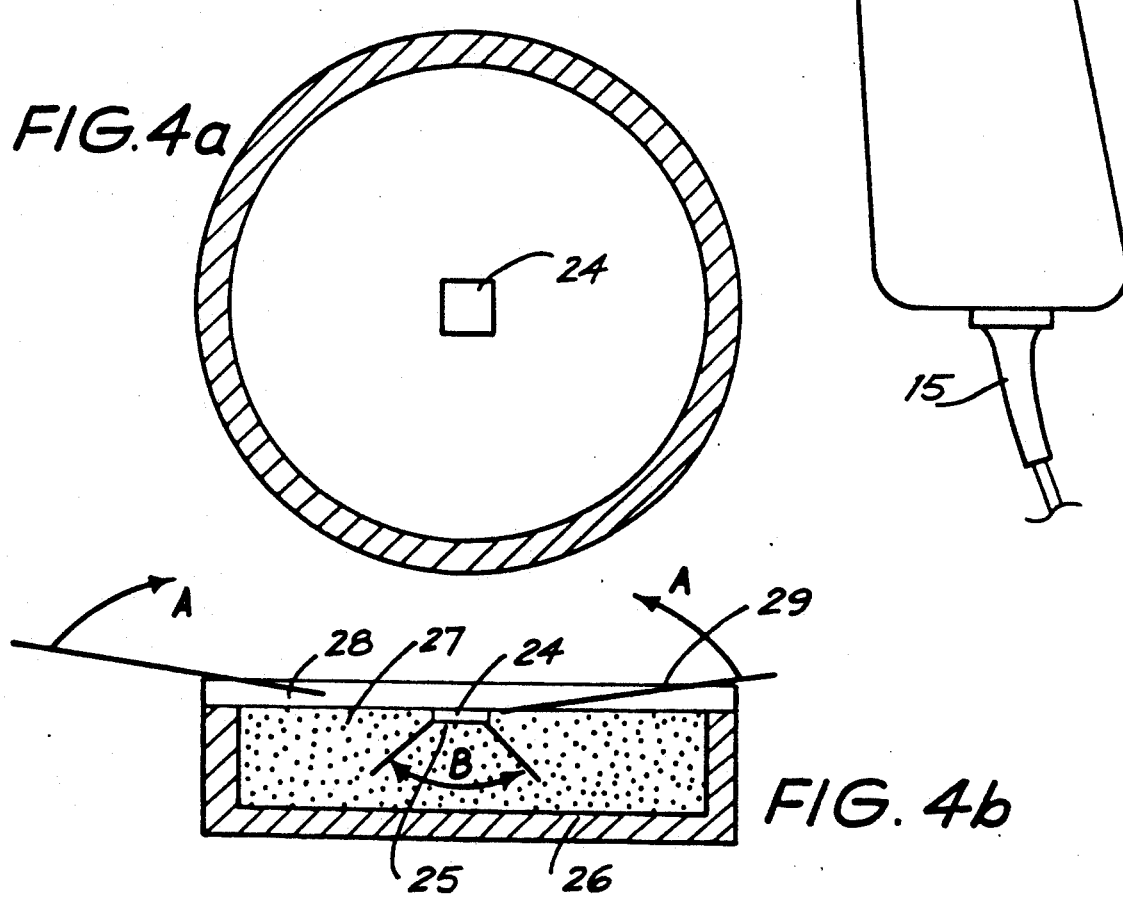
FIG. 4a
FIG. 4b

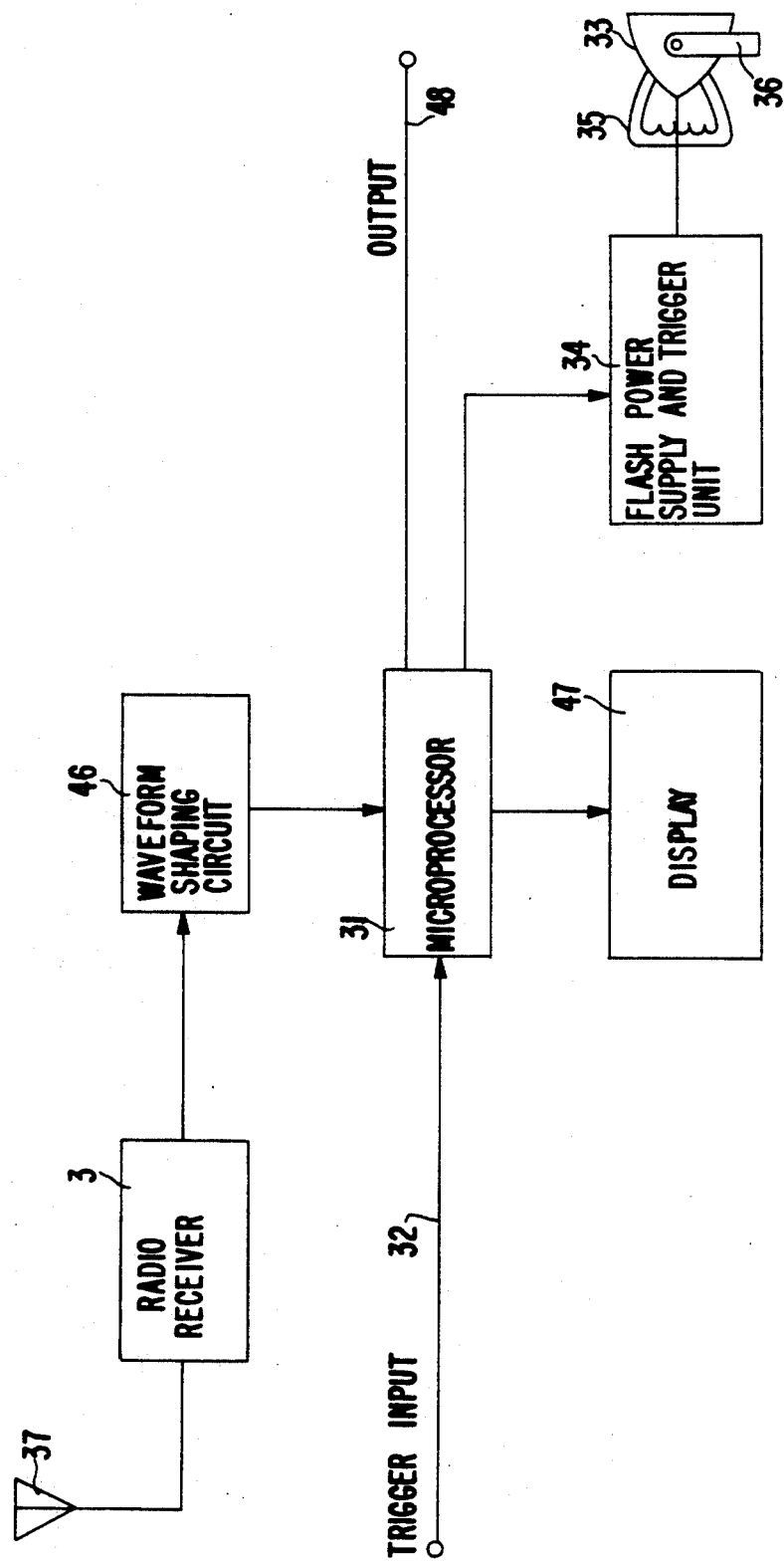

REMOTE DATA TRANSFER SYSTEM WITH AMBIENT LIGHT INSENSITIVE CIRCUITRY

CROSS-REFERENCE TO RELATED APPLICATIONS

This application is a continuation of application Ser. No. 431,674 filed Nov. 2, 1989 which is a continuation of application Ser. No. 205,538 filed Jun. 10, 1988 which is a continuation of application Ser. No. 4,349 filed Jan. 16, 1987 which is a continuation-in-part of application Ser. No. 802,063 filed 22 Nov. 1985, which was a continuation of application Ser. No. 549,626 filed 7 Nov. 1983, all abandoned.

The present invention relates to electronic apparatus for identification of objects including animals such as cattle and even pets. However, the invention is also applicable to identification of other objects such as packages and containers.

The apparatus is particularly suitable for use as a remote identification system by which an operator is able to identify a particular animal in a group at a distance of up to approximately thirty metres and possibly up to 200 meters. The apparatus is also useful in automatically identifying animals in short range applications such as dairys and feedlots.

There are known remote identification systems which use electronic tags each having a unique identifying code. The tags are attached to animals, and a remote interrogating unit is used to interrogate each device, and detect and store the identification code transmitted by the interrogated device.

The known remote identification systems use a radio frequency (RF) interrogating signal. Accordingly, the known systems cannot provide an interrogating beam of high directivity without the use of physically large antennae, and they suffer from the disadvantages that if a particular animal is to be identified, it must be within about a metre of the interrogator and no other animal carrying such a device should be within this range at the same time.

In the identification system of Australian patent application No. 79571/82, the interrogater transmits a coded RF signal and only the correspondingly coded transponder responds. However, a direction finder is then required to locate the transponder. To identify a particular animal, all possible codes must be transmitted and the animal must be close to the transmitter.

It is known that directional beams can be obtained by using light radiation instead of radio frequencies. An object identification system using infrared radiation is disclosed in U.S. Pat. No. 4,025,791 (Lennington). In the system of this patent, an interrogator emits infrared pulses to activate a transponder on the object to be identified. Upon such activation, the transponder emits in synchronism with the interrogator pulse an unique code in the form of infrared pulses in accordance with a program stored in a recirculating shift register. The system is an optical/optical system and is described with particular application to the identification of automobiles.

Such a system however, is not suitable for the identification of animals, such as cattle, for a number of reasons. The orientation between the transponder and interrogator cannot be guaranteed, especially from the point of view of having the interrogator in the acceptance angle of the transponder. Further, whilst RF interrogation system can tolerate some physical interference light (including infra-red) systems need true line of sight orientation. Whilst this can be assumed for motor vehicles which all face the same way and drive on the same side of the road, it cannot be assumed for animals. Further, the infrared beams of the known system are not sufficiently narrow to distinguish animals in a herd. The infrared beams generated by the interrogator of the system of U.S. Pat. No. 4,025,791 are not true directional beams, and the system does not operate until the vehicle carrying the transponder is in close vicinity to the interrogator. Also the transponder requires a relatively large amount of power to perform its functions and its battery must be renewed every six months or so. Such a transponder would not be suitable for use on livestock since its battery should last for the lifetime of the animal, typically ten years.

A highly directional laser beam is used in the weapon training system disclosed in U.S. Pat. No. 3,588,108. In this system, a laser is linked to an aiming device such as a sighting telescope before aiming at a target. The system includes a detector on the target for receiving the radiation and an indicator to provide information concerning the accuracy of the aim. The system however, is not an identification system since the detector receiving the laser radiation does not transmit an identifying signal to the operator. Furthermore, due to the complexity and cost of the laser and its associated control means, and eye safety considerations required for humans and animals the system is unsuitable for use for the identification of livestock.

The detector in particular performs a number of functions and its complex circuit requires a significant amount of power. While this does not pose a problem in the weapons training system as it used for short periods only and its battery may be recharged, the battery of a detector used in an animal identification system should last for the life of the animal.

U.S. Pat. No. 3,104,478 discloses another hit indicator apparatus, and further improvements and modifications of this apparatus are disclosed in U.S. Pat. Nos. 3,169,191; 3,434,226; 3,466,761 and 3,483,636. In the known hit indicator apparatus, a radio frequency transmitter at the weapon radiates an omnidirectional RF interrogation signal when the firer actuates the trigger of the weapon. All targets within the range of the RF transmitter are interrogated. An infrared transmitter on each target responds to the interrogation signal by radiating omnidirectionally, a coded infrared answer signal which identifies each target. At the weapon, a directional phototelescope responsive to infrared energy and boresighted with the weapon, receives infrared energy only from the particular target at which the weapon is aimed when the trigger is actuated. This system has a number of inherent disadvantages. First, upon transmission of the RF interrogation signal, all targets in the range are interrogated and all infrared transmitters on these targets radiate an infrared signal. Thus, each target transmitter consumes energy from its power supply every time an RF interrogation signal is generated, whether or not that particular target is being sighted. Since the device on the target requires a large power supply to provide sufficient energy for the numerous infrared transmissions, the device does not lend itself to miniaturisation. Furthermore, the device is not suitable for use on livestock as its battery would have to be changed several times during the lifetime of the animal to which it is attached.

The electronics of any non-passive detectors of all the above described identification systems are in a continuous "active" state, i.e. drawing significant current, in order to operate in their "receive" mode. For this reason, the battery life of such detectors is limited.

It is also known from U.S. Pat. No. 3,377,616 (Auer) to provide an optical/radio interrogation system in which the transponder is interrogated by a light beam and responds with a radio signal. This arrangement suffers from a number of disadvantages.

First, a separate light detector is used for each bit of information to be transmitted by radio. Therefore if sunlight, for example, were to enter two or more of the holes 25 leading to each detector, two or more detectors would be activated. As a result simultaneous transmission of bits would be attempted when only sequential transmission of bits is acceptable. As a consequence, elaborate screening of the detectors is required. This is unacceptable for an animal tag since the animal can move into any position and thus direct sunlight must be tolerated.

Secondly, the above problem requires that the detector be highly responsive only in substantially a single direction. Thus the transducer cannot accept an interrogating beam incident upon it over any one of a large number of possible incident angles. However, for animals such as livestock and pets, and even jumbled packages on a conveyor, an ability for the transducer to respond to light incident over a very wide angle is a substantial advantage.

Thirdly, the code of the transponder is hard wired and thus is unable to be changed except by changing the wiring of the circuit. Finally, if the number of transponders is increased, resulting in an increase in the magnitude required for the code numbers, this increases the physical size of each and every transponder since more detectors are required for each transponder. It is also known from U.S. Pat. No. 4,240,692 (Winston) to concentrate light by means of reflectors so as to gather light from a wide angle and direct it onto a detector located on the principle optical axis of the reflector system.

Such an arrangement is unsuitable for interrogator systems. Firstly the reflectors are inherently bulky and the wide detector angle is achieved by wide reflector apertures. This is almost useless for ear tags and the like. Secondly in order to achieve a detection angle in excess of 180° at least two reflectors each with its own detector are required. This requirement for a plurality of detectors creates further problems. Moreover, direct sunlight concentrated by reflection onto a detector could lead to spurious triggering.

It is the object of the present invention to overcome, or ameliorate, the abovementioned disadvantages by the use of a light concentrator in which wide angles of detection are able to be achieved by light scattering.

According to one aspect of the present invention there is disclosed a concentrator for the reception of light by a detector over a wide angle of detection, said concentrator comprising a housing at least a substantial part of which is transparent at the frequency of said light, a light scattering means located within said housing and arranged to receive light incident upon said transparent position, and a detector having a light detecting portion and being located within said housing with said light detecting portion facing said scattering means to receive light scattered therefrom whereby light passing at any angle through said transparent portion and incident upon said light scattering means is scattered thereby and a proportion of said scattered light is directed towards, and incident upon, said light detecting portion of said detector.

According to another aspect of the present invention there is disclosed a remote identification system for identifying objects such as livestock, pets and containers, said system comprising interrogator means including a light source to generate a narrow directional beam of light towards an object to be identified, and a radio frequency receiver for receiving a coded RF signal, at least one transponder adapted to be attached to a respective object to be identified, each said transponder comprising the above described concentrator, an electronic circuit connected to the detector of said concentrator for distinguishing between receipt of ambient light and said directional light beam by said detector, and a transmitter connected to said electronic circuit and operable thereby to transmit said coded RF signal upon receipt of said light beam by said detector.

According to a further aspect of the present invention there is disclosed a transponder for use in an identification system, said transponder being adapted to be attached to an object to be identified and comprising the above described concentrator, an electronic circuit connected to the dectector of said concentration for distinguished between receipt of ambient light and an interrogating light beam, and a transmitter connected to said electronic circuit and operable thereby to transmit a coded RF signal upon receipt of said interrogating light beam by said detector.

Embodiments of the present invention will now be described with reference to the accompanying drawings in which:

FIG. 2 is a schematic cross-sectional view of the interrogator of FIG. 1;

FIGS. 4a and 4b are plan and cross-sectional views of a light concentrator for use in the transponder tag of FIG. 1;

FIG. 5 is a schematic block diagram of the interrogator circuit of a second embodiment;

Figure 1:
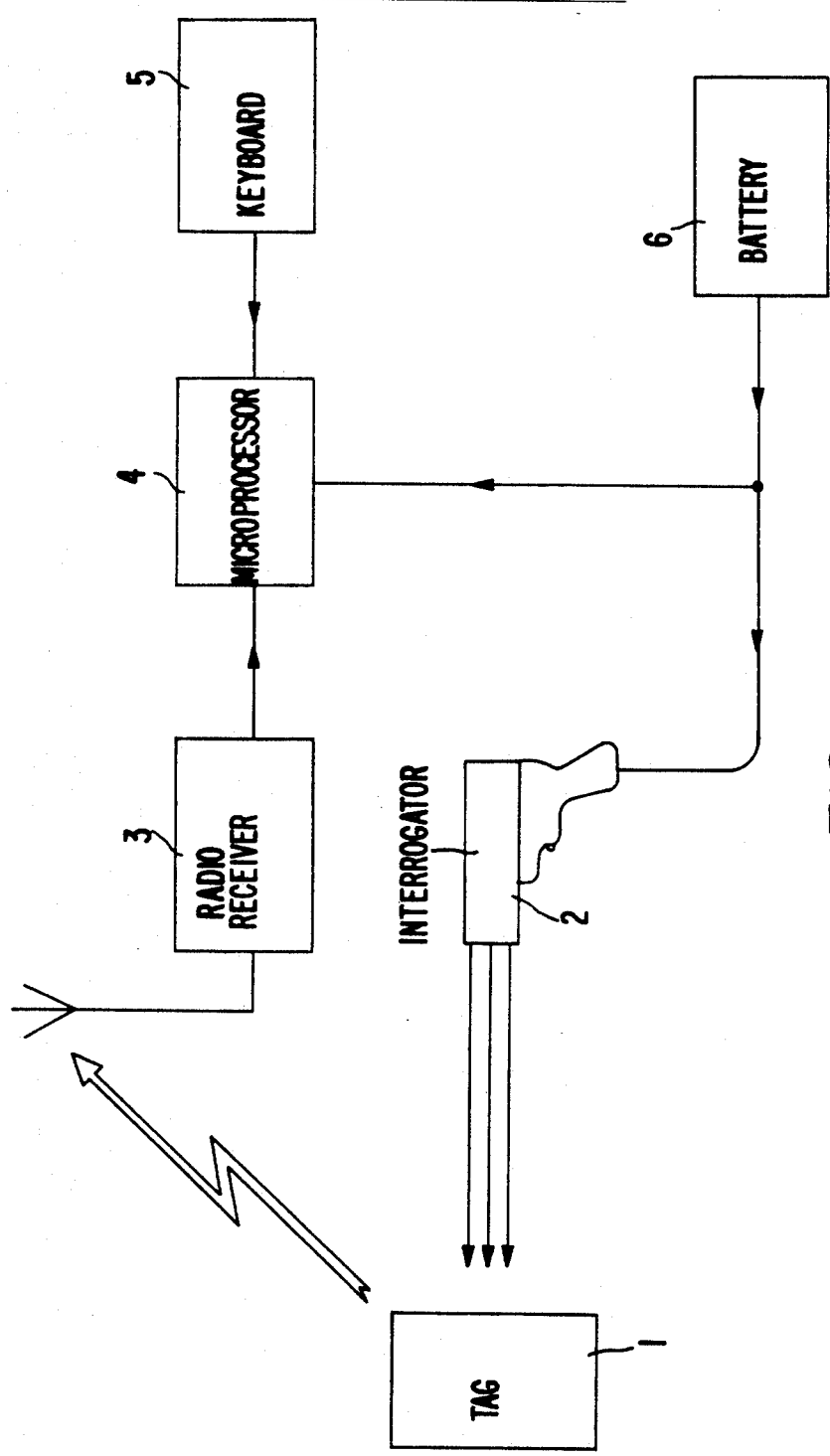
FIG. 1 is a schematic block diagram of an electronic identification system according to a first embodiment of the present invention which is particularly suitable for livestock such as free range cattle.

Turning to FIG. 1, the remote identification system of the first embodiment comprises an interrogator 2 which generates a narrow beam of light. Preferably, the interrogator has a pistol grip for easy handling by a stockman for example, and is powered from a battery 6 via a cable 15 in the handle. The optical interrogator 2 (or "light gun") is shown in more detail in FIG. 2. The interrogator 2 comprises a light source, such as Xenon flash bulb 10, for producing intense pulses of light of short rise time, e.g. less than 1 millisecond and typically approximately 100 microseconds. A reflector 12 placed behind the flash bulb 10 directs the light in a forward direction. The light is contained within the housing 9 of the gun 2 and focused to a narrow beam by a Fresnel lens 8 which is protected by a transparent plate 7. It will be apparent to those skilled in the art the light source can be any suitable source of radiation known generally as "light" e.g. infrared, laser, visible light. Electronic circuitry and/or power supply is (are) contained in a cavity 14 behind the flash bulb 10, and a display for the identification code is provided on the rear face 13 of the interrogator gun 2. External power is provided via the cable 15 in the handle or by internal batteries (not illustrated). The gun 2 is triggered by a switch 11 provided conveniently on the handle grip.

Each animal to be identified carries a transponder in the form of a "tag" 1. The tag 1 contains a photovoltaic array 16 which detects incoming light pulses and converts them to electrical signals. Typically, the interrogator gun 2 modulates the light beam in order to distinguish the interrogating light from the ambient light. Thus, the interrogating light beam is in the form of a short pulse, or short pulses, with sharply increasing intensity. The light from the interrogator gun 2 is concentrated in a two degree beam which illuminates approximately a one meter diameter area at a distance of 30 meters. It will be apparent that the interrogating light beam generated by the interrogator gun 2 is highly directional thereby enabling selected animals in a herd to be identified at remote distances. Moreover, the directional light beam can be obtained with a simple and inexpensive arrangement.

Figure 3:
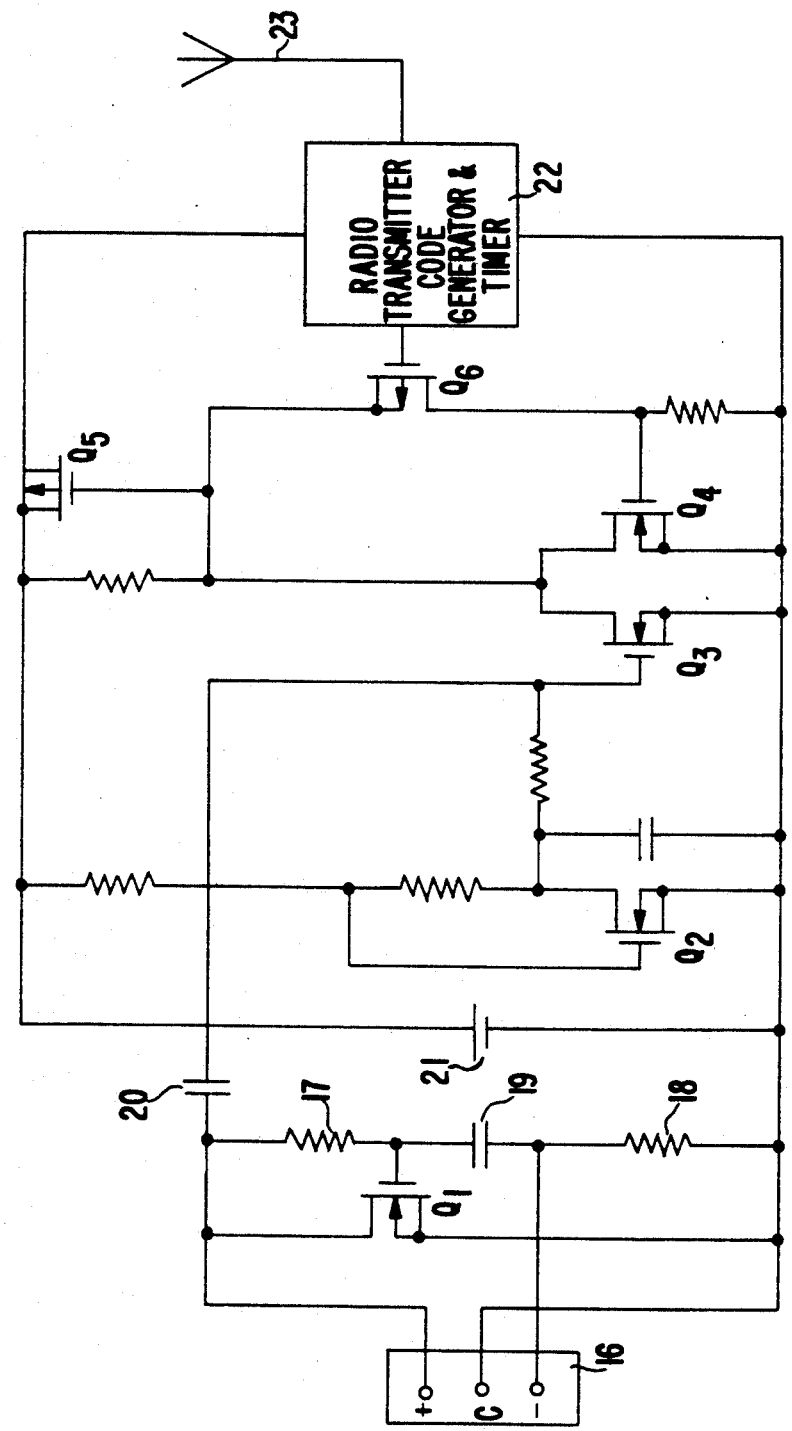
FIG. 3 is an electrical circuit diagram of the transponder tag of FIG. 1.

A circuit diagram of the tag electronics is shown in FIG. 3. Ambient light, such as sunlight, is concentrated onto a photovoltaic array 16 which has a centre tap giving equal positive and negative outputs. The output photocurrent of the photovoltaic array 16 due to ambient light is diverted into transisor Q1 which automatically adjusts its operating point so as to maintain a low potential difference across the photovoltaic array 16, thereby preventing saturation of the array 16 due to high ambient light levels. When a rapidly rising light pulse from the interrogator gun 2 impinges on the photovoltaic array 16, the potential difference across the output of the array rises rapidly in response as the transistor Q1 is prevented from suppressing this change due to resistors 17 and 18, and capacitor 19. The sharp rise in the potential difference is transferred through capacitor 20 to a trigger circuit including transistor Q3 which is held near to its threshold by a bias circuit incorporating transistor Q2. A latch circuit having transistors Q4 and Q5 then connects a battery cell 21 to a radio transmitter, code generator and timer 22 which radiates a coded signal from antenna 23. Upon completion of the response, transistor Q6 is used to reset the latch circuit which disconnects power to the transmitter and returns the tag to its "receive" mode, in which only minimal leakage current is drawn from the tag battery cell 21.

The tag circuitry is activated only by the detection of a sufficiently strong interrogating light pulse, i.e., the interrogating light pulse provides the stimulus to activate the tag transponder, but only the sighted tag transponder is activated, energy being conserved in the others.

The coded signal transmitted by the activated tag transponder is received by a radio receiver 3 which detects and decodes the transmitted signal. The decoded signal is then displayed and/or passed to a computing circuit such as a microprocessor 4 for further processing and/or storage. The operator is able to interact with the microprocessor 4 via keyboard 5, e.g. additional information may be added to the stored identification signal.

It will be apparent to those skilled in the art that the tag electronics can be integrated. Furthermore, a rechargeable energy storage device such as a capacitor or secondary cell can be used to store energy derived from ambient sunlight and provide such energy to the transmitter when required, thereby prolonging battery life.

Each tag transponder includes a non-imaging light concentrator, as shown in FIGS. 4a and 4b for example. In the light concentrator, a photovoltaic array 24 is arranged so that its active surface 25 faces away from the direction of the primary incident light. The cup-shaped concentrator has a diffuse white internal surface 26, and contains a filling 27 typically of transparent epoxy or plastic. A transparent upper sheet 28 is placed across the top of the concentrator and supports the array 24. In operation, light incident upon the upper surface 29 of the concentrator is refracted from wide angles of incidence into the concentrator, and then diffusely reflected from the surface 26. Some of this diffuse radiation falls directly onto the array surface 25, some is totally internally reflected, and some escapes from the concentrator.

It will be apparent that the wide angle of detection (schematically indicated by A—A in FIG. 4b) of the concentrator is much greater than the angle of detection (B) of the array 24 above.

A modest concentrating effect is also produced whilst at the same time the array 24 now produces a slower response to a shadow moving across the concentrator when it is being illuminated by direct sunlight. Thus, spurious triggering of the tag electronics is substantially eliminated.

The electronic identification is particularly, but not solely, suitable for use on animals such as livestock. A tag transponder is attached to each animal to be identified, and the operator (farmer, stockman, etc) is able to identify animals up to thirty meters away (and possibly up to 200 meters away) merely by pointing the interrogating gun at the selected animal and pressing the switch 11. When the interrogating beam generated by the interrogating gun strikes the tag transponder on the selected animal, a coded identification signal is tranmitted, received and decoded to provide the operator with an indication of the identity of the animal.

Turning now to FIG. 5-11, a second embodiment of the present invention will now be described. The interrogator circuit is illustrated in schematic block diagram form in FIG. 5. The interrogator is controlled by a microprocessor 31 which in its unactivated state monitors the trigger input 32 which is (manually or automatically in conventional manner) activated whenever interrogation is required. When a trigger is detected by the microprocessor 31, the microprocessor 31 causes the flash 33 to be operated by the flash power supply and trigger unit 34.

As schematically illustrated in FIG. 5, the flash 33 can be provided with a manual handle 35 if a portable apparatus is required, and/or with a stand 36 if the flash 33 is intended to be permanently mounted at a fixed location such as an animal feedlot or adjacent to a conveyor along which parcels move. The output of the flash 33 is preferably infra-red light and preferably comprises two pulses having a duration of a few microseconds and being spaced apart 13 milliseconds in time.

As will be explained hereafter, the operation of the flash 33 triggers the electronic circuit of the tag (FIG. 6) which transmits a coded radio signal. The coded radio signal from the tag is received in the antenna 37. The radio receiver 3 is tuned to or locks onto the radio signal received by the antenna 37. The received data are found, if this is possible, by utilizing the error correction and detection information which is included in the data, and then stores the data in the microprocessor 31. This data is then available for display by a liquid crystal display 47, and/or for transmission to a computer or the like via an output 48 having a standard protocol.

Figure 6:
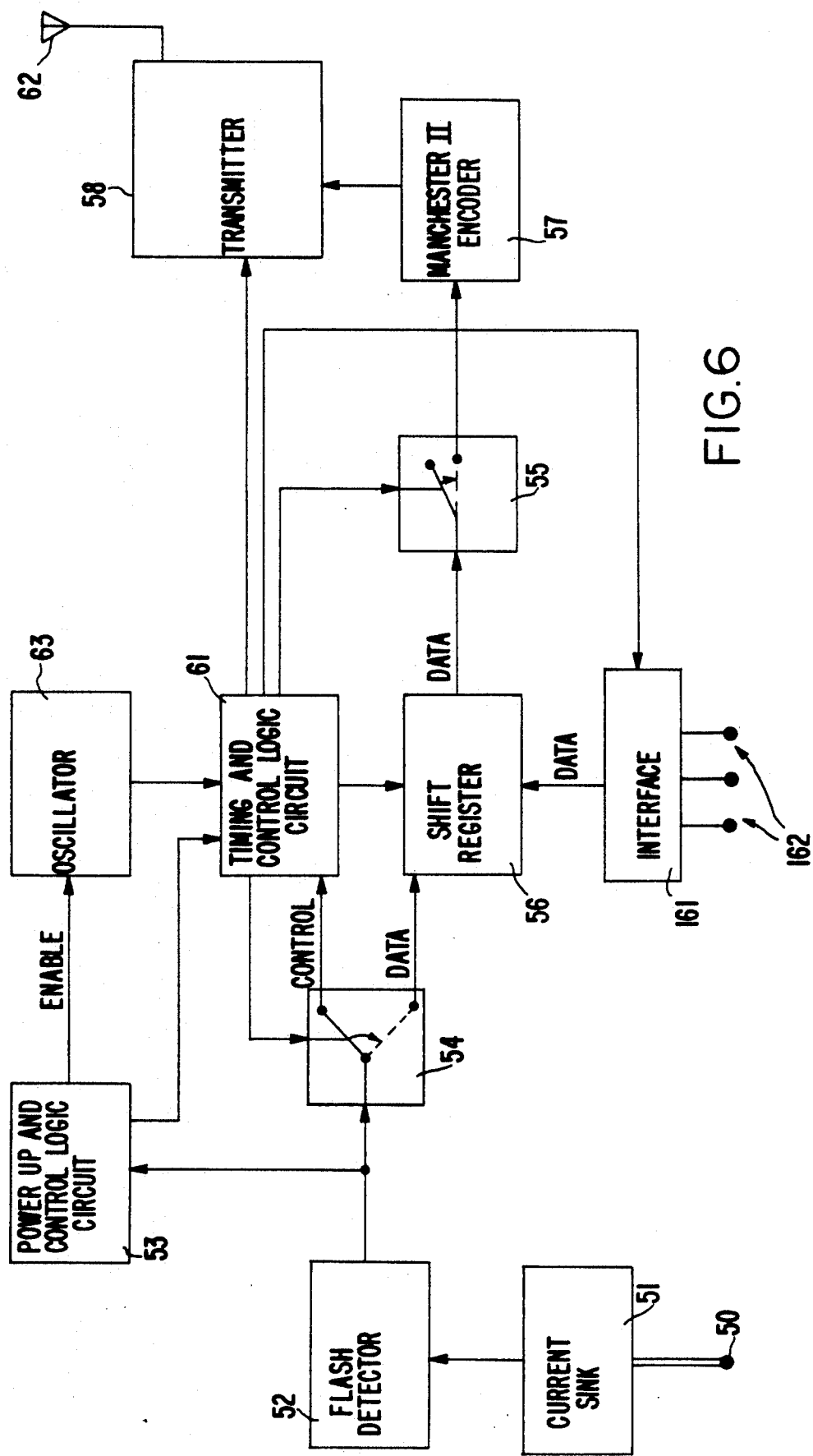
FIG. 6 is a schematic block diagram of the transponder circuit for use with the interrogator of FIG. 5.

Turning now to FIG. 6, the operation of the electronics of the tag transponder will now be described. The infra-red light pulses from the flash 33 are received by a detector 50 as will be described hereafter in more detail. The detector 50 comprises a PIN diode, a photo voltaic device, or the like which is connected to a current sink 51 which has an output connected to a flash detector circuit 52. Substantially all the power for the operation of the current sink 51 and flash detector circuit 52 following illumination is generated by the flash 33. Following successful detection of a signal from the flash 33, the flash detector 52 activates a power up and control logic circuit 53 which therefore supplies power to the remainder of the circuit thereby transforming the circuit from its quiescent state to its active state.

Based upon the output of the flash detector 52, a determination is made as to whether interrogation of the tag transponder or (re-) programming of the circuit of the tag transponder is required. If interrogation is required switch 54 is switched to the control position and switch 55 is closed. As a consequence, 88 bits of data are passed out of the shift register 56 to a Manchester II encoder 57. This data is repeated for error checking. This data is indicative of the identity of the particular tag transponder and/or real time information stored in the tag.

The output on the encoder 57 is passed to the tag transmitter 58. The transmitter 58 has two inputs one for data from the encoder 57 the other that controls the powering of the transmitter which is derived from a timing and control logic circuit 61. The transmitter 58 is modulated with the data provided by the encoder 57 and the modulated signal is applied to the transmitter antenna 62.

It is possible to amend the data stored in the shift register 56 by transmitting a series of light pulses comprising 88 bits of data to the detector 50. In this event, the switch 54 is initially switched to the control position to enable the timing and control logic circuit 61 to modify the operation of the shift register 56. Then switch 54 is switched to the data position to enable the new data to be read into the shift register 56 as it is received by the detector 50. Simultaneously, the old data from the shift register 56 is sent via switch 55 to the encoder 57 for transmission. Then the new data is sent from the shift register 56 and is transmitted from the transmitter 58. This provides a verification that the new data has been correctly stored in the tag transponder. This facility enables tag transponders to be recovered, for example from animals which have been slaughtered, and such recovered tag transponders can then be reprogrammed and used again. This can be repeated several times until eventually the battery life of the tag transponder is exhausted.

It will be apparent to those skilled in the art that the ability to re-program in this way can also be adapted to an ability to transmit real-time information and thereby expand the applications in which the apparatus can be used. The simple addition of a number of sensors 162 and an appropriate interface 161 which enables the output of the sensors 162 to be formatted into data acceptable by the shift register 56, enables real time information to be transmitted.

For example, the sensors 162 can determine current values of pressure or temperature in an installation or even updated status information such as the number of items (such as an exhaust manifold added to an engine block travelling down a production line). After interrogation, the timing and control logic circuit 61 enables the transducer 61 which sends the current value data to the shift register 56 for transmission via the transmitter 58.

Thus the tag transponder can be used as a remote information collection and storage device which can be interrogated selectively from a distance. For example the transponder can be connected to a electricity consumption meter or water consumption meter for interrogation from an inspector's motor vehicle. It can also be used in hazardous environments where information can be remotely collected and returned from a distance without an operator needing to approach the area, or any wiring between the hazardous area and the operator's position.

Figure 7:
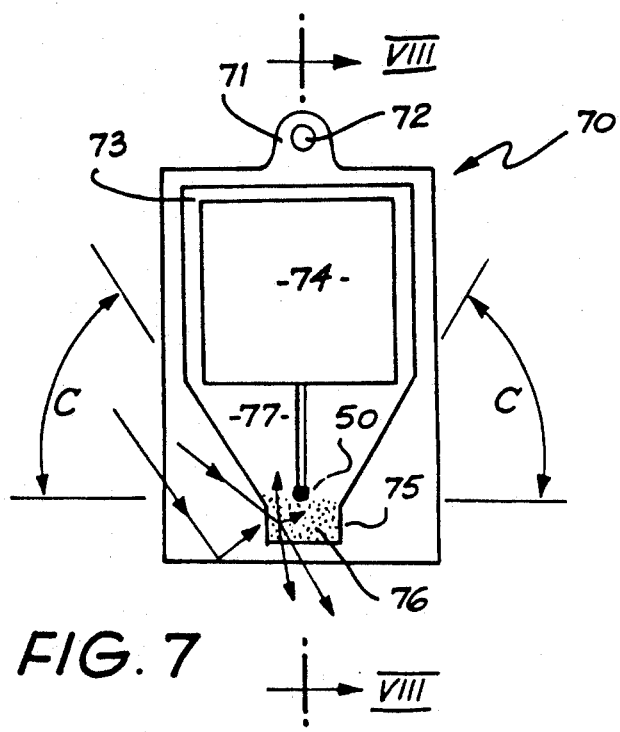
FIG. 7 is a schematic plan view of a tag transponder.
Figure 8:
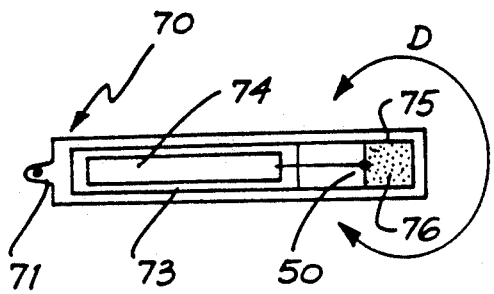
FIG. 8 is a cross-sectional view of the transponder of FIG. 7 taken along the line VIII—VIII.

Turning now to FIGS. 7 and 8, the preferred form of the tag transponder housing 70 will now be described. The housing 70 is preferably moulded from plastics material such as polycabonate and has an ear 71 at one end. The ear 71 has an aperature 72 which enables the housing 71 to be attached to the ear of livestock or suspended below the collar of a domestic pet.

Within the housing 70 is a space 73 occupied by an integrated circuit 74 and the tag transponder battery (not illustrated).

At the end of the housing 70 opposite the ear 71 the space 73 contracts and terminates in a cylindrical recess 75 which is preferrably approximately 5 mm in diameter and 4 mm in length. The thickness of the polycarbonate material between the base of the recess 75 and the edge of the tag is preferrably 1 mm.

The recess 75 is filled with a potting compound such as two part epoxy or polyester resin which is clear or transparent at the frequency of the flash 33. In order to be rendered light scattering, the potting compound has distributed through it a powder such as titanium oxide, chalk dust or silica dust. Typically, such dust or powder is added in very small concentrations, the dust being first placed in a solution and then approximately one drop of the solution is added to approximately 100 ml of the potting compound. It is a relatively straight forward matter to conduct trials in order to arrive at a correct concentration which produces the desired degree of light scattering without being either too transparent or too opaque.

The detector 50 preferably takes the form of a PIN diode having an active area of approximately 1 square mm. The detector 50 is placed at the edge of the potting compound so that the active surface area of the detector 50 is embedded in the light scattering material 76.

It will be apparent from FIG. 7 that the side of the taper of the space 77 extends at an angle C of approximately 15° relative to the end of the tag. This means that the detection angle of the tag in the plane of FIG. 7 is approximately 180° plus 2° C. As indicated in FIG. 7 a light ray entering one corner of the housing 70 is totally internally reflected by the polycarbonate material of the housing 70 and therefore strikes the light scattering material 76 where a portion of the light is scattered onto the active area of the detector 50. Further, a direct light ray entering the recess 75 and striking the scattering material 76 is scattered by the particles such that a significant portion of the energy falls onto the detector 50, even though it would not have been possible for this light ray to have been directly incident on the detector 50. Because of the particular geometry selected for the housing 70 and the light scattering properties of the material 76, the concentrator formed by the housing 70 collects light substantially omnidirectionally and the gain is substantially uniform, at least within an order of magnitude. Typically, the variation of gain with angle is of the order of 2:1 or less. The angle of detection or collection in the plane of FIG. 7 is indicated above whilst as seen in FIG. 8, the angle of detection D in the plane of FIG. 8 approaches 360°.

A further advantage of the housing 70 is that being made from polycarbonate material, it can be made opaque to white light but transparent to infra-red light. Thus the housing 70 acts as a filter which although not essential does reduce the overall intensity of the radiation received by the detector 50 and thus effectively increases the signal to noise ratio of the detector 50. Still further advantage of the housing 70 is that it is a very low cost and low size and that no expensive lenses or alike are required.

Figure 9:
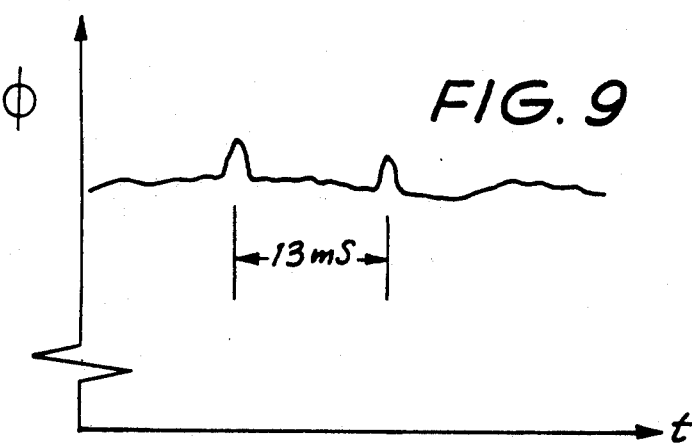
FIG. 9 is a graph illustrating light flux as a function of time during interrogation.
Figure 11:
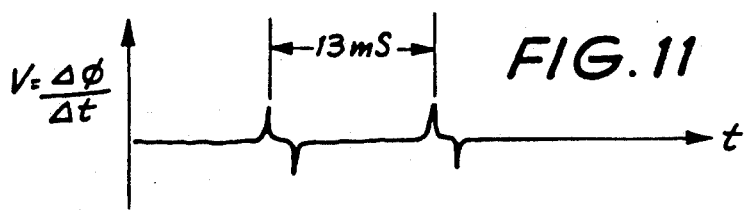
FIG. 11 is a graph illustrating a dectector voltage.

The discrimination of the transponder so as to be able to detect the presence of the beam of light from the flash 33 even in strong sunlight will now be described with reference to FIGS. 9 to 11. It should be understood that the ratio of the beam intensity to ambient intensity under strong sunlight conditions is less than or equal to approximately 0.1 at normal ranges. Thus, as indicated in FIG. 9, the light flux incident upon the detector fluctuates with ambient light, and the magnitude of the pulses produced by the flash 33 is small relative to the total intensity of the light received by the detector.

Figure 10:
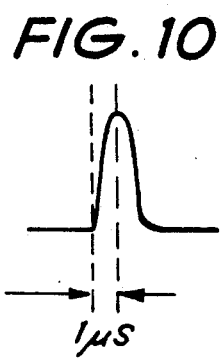
FIG. 10 is a graph illustrating each of the light pulses in detail.

As indicated in FIG. 10, each of the pulses produced by the flash 33 has a very fast rise time of the order of 1 microsecond and the pulses are spaced apart by approximately 13 milliseconds. Therefore if the flash detector 52 of FIG. 6 differentiates the output produced by the detector 50 and its current sink 51, a voltage as illustrated in FIG. 11 is produced. If the negative going spikes are ignored or removed by a rectifier, the detector 52 can then look for two positive going pulses of short duration spaced apart by a duration of 13 mS. In this way, the pulses produced by the flash 33 can be detected notwithstanding that the incident radiation produced by direct sunlight falling upon the housing 70 is approximately an order of magnitude greater than the intensity of the flash.

Figure 12:
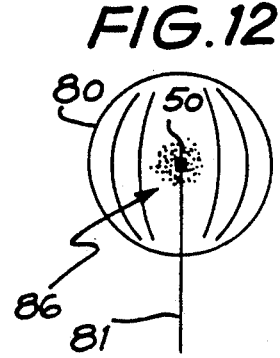
FIG. 12 is a schematic view of an alternative light concentrator.

Turning now to FIG. 12, an alternative form of housing 80 for the detector 50 is illustrated. The housing 80 is substantially spherical and is positioned above a stalk 81 which supports the housing 80 and detector 50. Preferably located around the detector 50 is a small sphere of light scattering material 86. It will be appreciated that the housing 80 is substantially completely omnidirectional in that light falling onto the sphere from practically every direction (other than the direction of the stalk 81) will be totally internally reflected within the sphere and some of this light will be incident upon the light scattering material 86 and hence fall upon the detector 50.

It will be apparent to those skilled in the art that the above described arrangement of concentrator enables a very wide angle of detection to be achieved with both simplicity and low cost. It will also be apparent that no imaging is involved as would be the case with a reflector or lens which produces an image at a focus. Whilst the above arrangement does provide a disadvantage in that there is some attenuation of the light as a result of the light scattering so that the intensity of the light received by the detector 51 is less than the intensity of the light falling upon the housing 70 or 80, for example, this disadvantage is more than adequately compensated for by the ability to achieve detection over a wide range of angles.

The ability to achieve detection over a wide range of angles is particularly important in relation to livestock and both the detector and the electronics are designed to enable the system to operate in all conditions which agricultural animals are farmed including the open range and confined conditions such as feedlots or dairys where the spacing between the animals and a stationary interrogator is only approximately 1 meter. Also the system is clearly capable of operating successfully with tags attached to animals, for example ear tags or collar tags, despite the tags in use being in all manner of both orientation and motion relative to the interrogator. These capabilities also enable the system of the present invention to compete with bar code readers which do not possess the orientation and motion advantages of the system.

The foregoing describes only some embodiments of the present invention, and modifications which are obvious to those skilled in the art may be made thereto without departing from the scope of the present invention as defined in the following claims. For example, the light which interrogates the transponder need not be confined to a narrow directional beam since some applications may require a broad beam or even a rotating beam. Also the beam can be focused if necessary by reflectors and/or lens systems.

What we claim is:

1. A responder for performing an operation in response to a light beam directed towards and impinging upon the responder, said light beam having a primary sharp light intensity change, the responder including:
    a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face is scattered by said light scattering means and a proportion of said scattered light is directed towards and is incident upon said light detecting portion of said light detector, said proportion of said scattered light consisting of an average of the total light impinging on said receiving face,
an electronic distinguishing circuit connected to said light detector to receive said detector signals and operative to distinguish between detector signals produced by ambient light and by said light beam, said distinguishing circuit being operative to generate an indicative output when said sharp light intensity change is received and detected by said light detector, and
an operational circuit responsive to said indicative output of said electronic distinguishing circuit and operative to perform said operation in response to said indicative output.

2. A remote identification system for identifying objects, said system comprising a plurality of responders, each of said plurality of responders comprising a responder as claimed in claim 1, said system further comprising interrogator means including a light source to generate said beam of light and direct the beam towards an object to be identified, and a receiver for receiving a coded signal, said object having associated therewith one of said plurality of responders and which is operative on receipt thereby of said beam of light to transmit said coded signal to said receiver.

3. A responder as claimed in claim 1 wherein the light scattering means comprises a diffusively reflective surface of said housing and said light detecting portion faces said diffusively reflective surface and does not face said receiving face.

4. A responder as claimed in claim 3 wherein said housing has an opaque generally cup shaped body, said diffusively reflective surface comprising the interior surface of said cup shaped body, said receiving face of said housing comprising a transparent cover which closes said cup shaped body, said light detector being mounted on the transparent cover and facing inwardly into said cup shaped body so as to face and receive light diffusively reflected from said reflective surface.

5. A responder as claimed in claim 1 wherein said light scattering means comprises an essentially transparent solid body of said housing, said body having light scattering particles distributed therein so as to scatter light entering said body through said receiving face, said light detecting portion of the light detector being located in contact with said solid body.

6. A responder as claimed in claim 5 wherein said body is composed of a material selected from the group of materials consisting of epoxy resins and polyester resins, and wherein said light scattering particles comprise particles of powder selected from the group consisting of powdered titanium dioxide, powdered chalk, and silica dust.

7. A responder as claimed in claim 5 wherein said receiving face of said housing subtends an arc of greater than 180° so that light incident upon said receiving face over a wide angle of greater than 180° passes through the receiving face and is scattered by said light scattering means and a proportion of said scattered light is directed towards and is incident upon said light detecting portion.

8. A responder as claimed in claim 5 wherein said light detector is embedded within said essentially transparent solid body with the light scattering particles distributed in said body.

9. A responder as claimed in claim 8 wherein said solid body in which said light detector is embedded is enclosed within an outer housing portion through which incident light passes to enter said body so that there exists a boundary between said solid body and said outer housing portion, a substantial proportion of light which enters said body and is incident upon the boundary between the body and the outer housing portion being totally internally reflected within said body so as to thereby confine a substantial proportion of light within said body and increase the proportion of the incident light impinging upon the light detecting portion of said light detector.

10. A responder as claimed in claim 5 wherein said light beam comprises an infrared light beam and wherein said housing includes an opaque housing portion which is opaque to visible light but transparent to infrared light so as to thereby substantially prevent visible light passing through the housing and impinging on the light detecting portion of the light detector, the light scattering means being operative to scatter infrared light passing through the receiving face into the housing and passing through the opaque housing body portion.

11. A responder as claimed in claim 5 wherein said operation performed by said operational circuit comprises the transmission of a coded signal, said operational circuit comprising an electromagnetic radiation transmitter for transmitting said coded signal, said coded signal being indicative of data to be transmitted by said responder in response to said indicative output.

12. A responder for performing an operation in response to a light beam directed towards and impinging upon the responder, said light beam having a primary sharp light intensity change, and at least one subsequent light pulse, the or each said at least one subsequent light pulse being defined by a subsequent light pulses being generated at a predetermined interval after said primary sharp light intensity change; said responder including:
a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face is scattered by said light scattering means and a proportion of said scattered light is directed towards and is incident upon said light detecting portion of said light detector, said proportion of said scattered light consisting of an average of the total light impinging on said receiving face,
an electronic distinguishing circuit connected to said light detector to receive said detector signals and operative to distinguish between detector signals produced by ambient light and by said light beam by responding only to detection of said secondary sharp light intensity change provided that said secondary sharp light intensity change is detected by said light detector at said predetermined interval after said primary sharp light intensity change whereby said distinguishing circuit is operative to generate an indictive output only when said predetermined interval exists between said primary sharp light intensity change and the or one of said at least one subsequent radiation pulses, and an operational circuit responsive to said indicative output of said electronic distinguishing circuit and operative to perform said operation in response to said indicative output.

13. A responder as claimed in claim 12 wherein the light scattering means comprises a diffusively reflective surface of said housing and said light detecting portion faces said diffusively reflective surface and does not face said receiving face.

14. A responder as claimed in claim 13 wherein said housing has an opaque generally cup shaped body, said diffusively reflective surface comprising the interior surface of said cup shaped body, said receiving face of said housing comprising a transparent cover which closes said cup shaped body, said light detector being mounted on the transparent cover and facing inwardly into said cup shaped body so as to face and receive light diffusively reflected from said reflective surface.

15. A responder as claimed in claim 12 wherein said light scattering means comprises an essentially transparent solid body of said housing, said body having light scattering particles distributed therein so as to scatter light entering said body through said receiving face, said light detecting portion of the light detector being located in contact with said solid body.

16. A responder as claimed in claim 15 wherein said body is composed of a material selected from the group of materials consisting of epoxy resins and polyester resins, and wherein said light scattering particles comprise particles of powder selected from the group consisting of powdered titanium dioxide, powdered chalk, and silica dust.

17. A responder as claimed in claim 15 wherein said receiving face of said housing subtends an arc of greater than 180° so that light incident upon said receiving face over a wide angle of greater than 180° passes through the receiving face and is scattered by said light scattering means and a proportion of said scattered light is directed towards and is incident upon said light detecting portion.

18. A responder as claimed in claim 15 wherein said light detector is embedded within said essentially transparent solid body with the light scattering particles distributed in said body.

19. A responder as claimed in claim 18 wherein said solid body in which said light detector is embedded is enclosed within an outer housing portion through which incident light passes to enter said body so that there exists a boundary between said solid body and said outer housing portion, a substantial proportion of light which enters said body and is incident upon the boundary between the body and the outer housing portion being totally internally reflected within said body so as to thereby confine a substantial proportion of light within said body and increase the proportion of the incident light impinging upon the light detecting portion of said light detector.

20. A responder as claimed in claim 15 wherein said light beam comprises an infrared light beam and wherein said housing includes an opaque housing portion which is opaque to visible light but transparent to infrared light so as to thereby substantially prevent visible light passing through the housing and impinging on the light detecting portion of the light detector, the light scattering means being operative to scatter infrared light passing through the receiving face into the housing and passing through the opaque housing body portion.

21. A responder as claimed in claim 15 wherein said operation performed by said operational circuit comprises the transmission of a coded signal, said operational circuit comprising an electromagnetic radiation transmitter for transmitting said coded signal, said coded signal being indicative of data to be transmitted by said responder in response to said indicative output.

22. A responder for performing an operation in response to a light beam directed towards and impinging upon the responder, said light beam having a primary sharp light intensity change, the responder including:

a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face is scattered by said light scattering means and a proportion of said scattered light is directed towards and is incident upon said light detecting portion of said light detector, said proportion of said scattered light consisting of an average of the total light impinging on said receiving face, an electronic distinguishing circuit connected to said light detector to receive said detector signals and operative to distinguish between detector signals produced by ambient light and by said light beam, said distinguishing circuit being operative to generate an indicative output when said sharp light intensity change is received and detected by said light detector, an operational circuit responsive to said indicative output of said electronic distinguishing circuit and operative to perform said operation in response to said indicative output, a switch circuit responsive to said distinguishing circuit, said switch circuit being operative to enable a power draw to occur and thereby cause operation of said operational circuit only upon said distinguishing circuit generating said indicative output, said switch circuit being further operative after operation of said operational circuit to return said responder to a low power draw standby state.

23. A responder as claimed in claim 22 wherein the light scattering means comprises a diffusively reflective surface of said housing and said light detecting portion faces said diffusively reflective surface and does not face said receiving face.

24. A responder as claimed in claim 23 wherein said housing has an opaque generally cup shaped body, said diffusively reflective surface comprising the interior surface of said cup shaped body, said receiving face of said housing comprising a transparent cover which closes said cup shaped body, said light detector being mounted on the transparent cover and facing inwardly into said cup shaped body so as to face and receive light diffusively reflected from said reflective surface.

25. A responder as claimed in claim 22 wherein said light scattering means comprises an essentially transparent solid body of said housing, said body having light scattering particles distributed therein so as to scatter light entering said body through said receiving face, said light detecting portion of the light detector being located in contact with said solid body.

26. A responder as claimed in claim 25 wherein said body is composed of a material selected from the group of materials consisting of epoxy resins and polyester resins, and wherein said light scattering particles comprise particles of powder selected from the group consisting of powdered titanium dioxide, powdered chalk, and silica dust.

27. A responder as claimed in claim 25 wherein said receiving face of said housing subtends an arc of greater than 180° so that light incident upon said receiving face over a wide angle of greater than 180° passes through the receiving face and is scattered by said light scattering means and a proportion of said scattered light is directed towards and is incident upon said light detecting portion.

28. A responder as claimed in claim 25 wherein said light detector is embedded within said essentially transparent solid body with the light scattering particles distributed in said body.

29. A responder as claimed in claim 28 wherein said solid body in which said light detector is embedded is enclosed within an outer housing portion through which incident light passes to enter said body so that there exists a boundary between said solid body and said outer housing portion, a substantial proportion of light which enters said body and is incident upon the boundary between the body and the outer housing portion being totally internally reflected within said body so as to thereby confine a substantial proportion of light within said body and increase the proportion of the incident light impinging upon the light detecting portion of said light detector.

30. A responder as claimed in claim 25 wherein said light beam comprises an infrared light beam and wherein said housing includes an opaque housing portion which is opaque to visible light but transparent to infrared light so as to thereby substantially prevent visible light passing through the housing and impinging on the light detecting portion of the light detector, the light scattering means being operative to scatter infrared light passing through the receiving face into the housing and passing through the opaque housing body portion.

31. A responder as claimed in claim 25 wherein said operation performed by said operational circuit comprises the transmission of a coded signal, said operational circuit comprising an electromagnetic radiation transmitter for transmitting said coded signal, said coded signal being indicative of data to be transmitted by said responder in response to said 32. A responder for performing an operation in response to a light beam directed towards and impinging upon the responder, said light beam having a primary sharp light intensity change, the responder including:
   a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face is scattered by said light scattering means and a proportion of said scattered light is directed towards and is incident upon said light detecting portion of said light detector, said proportion of said scattered light consisting of an average of the total light impinging on said receiving face,
   an electronic distinguishing circuit connected to said light detector to receive said detector signals and operative to distinguish between detector signals produced by ambient light and by said light beam, said distinguishing circuit being operative to generate an indicative output when said sharp light intensity change is received and detected by said light detector,
   an operational circuit responsive to said indicative output of said electronic distinguishing circuit and operative to perform said operation in response to said indicative output,
   a switch circuit responsive to said distinguishing circuit,
   said switch circuit being operative to enable a power draw to occur and thereby cause operation of said operational circuit only upon said distinguishing circuit generating said indicative output, said switch circuit being further operative after operation of said operational circuit to return said responder to a low power draw standby state, said detector signals having a significant power level sufficient to provide power for operation of said electronic distinguishing circuit and for providing power for operation of said switch circuit.

33. A responder as claimed in claim 32 wherein the light scattering means comprises a diffusively reflective surface of said housing and said light detecting portion faces said diffusively reflective surface and does not face said receiving face.

34. A responder as claimed in claim 33 wherein said housing has an opaque generally cup shaped body, said diffusively reflective surface comprising the interior surface of said cup shaped body, said receiving face of said housing comprising a transparent cover which closes said cup shaped body, said light detector being mounted on the transparent cover and facing inwardly into said cup shaped body so as to face and receive light diffusively reflected from said reflective surface.

35. A responder as claimed in claim 32 wherein said light scattering means comprises an essentially transparent solid body of said housing, said body having light scattering particles distributed therein so as to scatter light entering said body through said receiving face, said light detecting portion of the light detector being located in contact with said solid body.

36. A responder as claimed in claim 35 wherein said body is composed of a material selected from the group of materials consisting of epoxy resins and polyester resins, and wherein said light scattering particles comprise particles of powder selected from the group consisting of powdered titanium dioxide, powdered chalk, and silica dust.

37. A responder as claimed in claim 35 wherein said receiving face of said housing subtends an arc of greater than 180° so that light incident upon said receiving face over a wide angle of greater than 180° passes through the receiving face and is scattered by said light scattering means and a proportion of said scattered light is directed towards and is incident upon said light detecting portion.

38. A responder as claimed in claim 35 wherein said light detector is embedded within said essentially transparent solid body with the light scattering particles distributed in said body.

39. A responder as claimed in claim 38 wherein said solid body in which said light detector is embedded is enclosed within an outer housing portion through which incident light passes to enter said body so that there exists a boundary between said solid body and said outer housing portion, a substantial proportion of light which enters said body and is incident upon the boundary between the body and the outer housing portion being totally internally reflected within said body so as to thereby confine a substantial proportion of light within said body and increase the proportion of the incident light impinging upon the light detecting portion of said light detector.

40. A responder as claimed in claim 35 wherein said light beam comprises an infrared light beam and wherein said housing includes an opaque housing portion which is opaque to visible light but transparent to infrared light so as to thereby substantially prevent visible light passing through the housing and impinging on the light detecting portion of the light detector, the light scattering means being operative to scatter infrared light passing through the receiving face into the housing and passing through the opaque housing body portion.

41. A responder as claimed in claim 35 wherein said operation performed by said operational circuit comprises the transmission of a coded signal, said operational circuit comprising an electromagnetic radiation transmitter for transmitting said coded signal, said coded signal being indicative of data to be transmitted by said responder in response to said indicative output.

42. A responder for performing transmitting a signal in response to a light beam directed towards and impinging upon the responder, said light beam having a primary sharp light intensity change, the responder including:
a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face is scattered by said light scattering means and a proportion of said scattered light is directed towards and is incident upon said light detecting portion of said light detector, said proportion of said scattered light consisting of an average of the total light impinging on said receiving face,
an electronic distinguishing circuit connected to said light detector to receive said detector signals and operative to distinguish between detector signals produced by ambient light and by said light beam, said distinguishing circuit being operative to generate an indicative output when said sharp light intensity change is received and detected by said light detector, and
an electromagnetic transmitter for transmitting a coded signal, said coded signal being indicative of data to be transmitted by said responder in response to said light beam impinging on said responder.

43. A responder as claimed in claim 42 wherein said electromagnetic transmitter is a radio frequency transmitter for transmitting said coded signal substantially omnidirectionally and said coded signal is a coded radio frequency signal.

44. A responder for transmitting a data signal in response to a light beam directed towards and impinging upon the responder, said light beam having a sharp light intensity change, the responder including:
a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face of incidence is scattered by said light scattering means and a proportion of said scattered light is directed towards and is incident upon said light detecting portion of said light detector, said proportion of said scattered light consisting of an average of the total light impinging on said receiving face,
an electronic distinguishing circuit connected to said light detector to receive said detector signals and operative to distinguish between detector signals produced by ambient light and by said light beam, said distinguishing circuit being operative to generate an indicative output when said sharp light intensity change is received and detected by said light detector, and an operational circuit responsive to said indicative output of said electronic distinguishing circuit and operative to transmit a data signal in response to said indicative output, a switch circuit responsive to said distinguishing circuit, said switch circuit being operative to enable a power draw to occur and thereby cause operation of said operational circuit only upon said distinguishing circuit generating said indicative output, said switch circuit being further operative after operation of said operational circuit to return said responder to a low power draw standby state, and a storage means for storing data to be transmitted by said operational circuit and a control logic circuit responsive to said switch circuit and operative to selectively (i) cause transfer of said data stored in said storage means to said operational circuit, and (ii) enable receipt of further data and storage of said further data in said storage means.

45. A responder as claimed in claim 44 wherein said light beam has at least one subsequent light pulse, the or each said at least one subsequent light pulse being defined by a secondary sharp light intensity change, the or one of said at least one subsequent light pulses being generated at a predetermined interval after said primary sharp light intensity change; and wherein said electronic distinguishing circuit is operative to distinguish between detector signals produced by ambient light and by said light beam by responding only to detection of said secondary sharp light intensity change provided that said secondary sharp light intensity change is detected by said light detector at said predetermined interval after said primary sharp light intensity change.

46. A responder as claimed in claim 45 wherein said further data comprises a series of said detector signals generated by said detector in response to receipt of a series of light pulses thereby, all the light pulses being defined by sharp light intensity changes subsequent to said secondary light intensity change.

47. A remote data transfer system including an interrogator means for initiating a data transfer operation and for receiving data transferred and further including at least one transponder for transmitting data in response to said interrogator means, said interrogator means comprising:

a light source for generating a light beam directed towards said transponder, said light beam having a primary sharp light intensity change, said light source being further operative to generate at least one subsequent light pulse defined by a secondary sharp light intensity change, said secondary sharp light intensity change being at a predetermined interval after said primary sharp light intensity change; and a radio frequency receiver for receiving data transmitted by said transponder;

said transponder including:

a radio frequency transmitter for transmitting substantially omnidirectionally a coded radio frequency signal indicative of data to be transferred by said transponder to said interrogator means in response to operation of said light source;

a light collector, the light collector being arranged to receive incident light impinging thereon, said light collector comprising a housing having a receiving face onto which said incident light impinges, said incident light passing through the receiving face, the light collector further including a light detector, the light detector having a light detecting portion located within said housing and arranged so that said light detecting portion receives incident light without said light collector causing imaging on said light detecting portion of light sources producing said incident light, said light detector generating detector signals in response to incident light impinging on said light detecting portion, the light collector further including light scattering means located within said housing and arranged to scatter light passing through the receiving face into the housing whereby incident light passing through the receiving face is scattered by said light scattering means and a proportion of said scattered light is directed towards and is incident upon said light detecting portion of said light detector, said proportion of said scattered light consisting of an average of the total light impinging on said receiving face, an electronic distinguishing circuit connected to said light detector for distinguishing between ambient light and said light beam, said distinguishing circuit including a suppressor circuit for suppressing said detector signals from said light detector unless a sharp light intensity change is received and detected by said light detector;

a switch circuit responsive to said distinguishing circuit;

said distinguishing circuit being further operative to distinguish a genuine operation of the interrogator and to cause operation of said switch circuit by responding only to detection of said secondary sharp light intensity change provided that said secondary sharp light intensity change is detected at said respective predetermined interval after said primary sharp light intensity change is detected by said light detector, so that said distinguishing circuit is responsive only if said predetermined interval exists between said primary and secondary sharp light intensity changes;

said switch circuit being operative to enable a power draw to occur and thereby cause operation of said transmitter only upon said distinguishing circuit distinguishing said secondary sharp light intensity change, said switch circuit being further operative after transmission of said coded signal by said transmitter to return said transponder to a low power draw standby state, and a storage means for storing data to be transmitted by said transmitter and a control logic circuit responsive to said switch circuit and operative to selectively (i) cause transfer of said data stored in said storage means to said transmitter, and (ii) enable receipt of further data externally from said interrogator means and storage of said further data in said storage means, said further data comprising a series of said detector signals generated by said light detector in response to receipt of a series of light pulses thereby after said secondary sharp light intensity change.

* * * * *

UNITED STATES PATENT AND TRADEMARK OFFICE
CERTIFICATE OF CORRECTION

PATENT NO. : 5,134,277
DATED : July 28, 1992
INVENTOR(S) : Yerbury et al.

It is certified that error appears in the above-identified patent and that said Letters Patent is hereby corrected as shown below:

In the Abstract, 5th line, change "30-14" to -- 30 --

In column 6 at lines 48-49 change "tranmitted," to -- transmitted, --

In column 15 at line 68 after "by said circuit responder in response to said" add -- indicative output. --

Signed and Sealed this

Twenty-fifth Day of April, 1995

Attest:

BRUCE LEHMAN

*Attesting Officer*     *Commissioner of Patents and Trademarks*